(12) United States Patent
Kang et al.

(10) Patent No.: US 11,528,172 B2
(45) Date of Patent: Dec. 13, 2022

(54) METHOD FOR MULTIPLEXING BETWEEN REFERENCE SIGNALS IN WIRELESS COMMUNICATION SYSTEM, AND APPARATUS FOR SAME

(71) Applicant: LG ELECTRONICS INC., Seoul (KR)

(72) Inventors: Jiwon Kang, Seoul (KR); Hyungtae Kim, Seoul (KR); Haewook Park, Seoul (KR); Kilbom Lee, Seoul (KR); Hyunsu Cha, Seoul (KR)

(73) Assignee: LG ELECTRONICS, INC., Seoul (KR)

(*) Notice: Subject to any disclaimer, the term of this patent is extended or adjusted under 35 U.S.C. 154(b) by 311 days.

(21) Appl. No.: 16/632,865

(22) PCT Filed: Jul. 23, 2018

(86) PCT No.: PCT/KR2018/008304
§ 371 (c)(1),
(2) Date: Jan. 21, 2020

(87) PCT Pub. No.: WO2019/017755
PCT Pub. Date: Jan. 24, 2019

(65) Prior Publication Data
US 2020/0204314 A1      Jun. 25, 2020

Related U.S. Application Data

(60) Provisional application No. 62/535,244, filed on Jul. 21, 2017.

(51) Int. Cl.
*H04L 27/26*     (2006.01)
*H04B 7/06*      (2006.01)
*H04L 5/00*      (2006.01)

(52) U.S. Cl.
CPC ....... *H04L 27/2613* (2013.01); *H04B 7/0626* (2013.01); *H04L 5/0023* (2013.01);
(Continued)

(58) Field of Classification Search
CPC . H04B 7/0626; H04L 27/2613; H04L 5/0023; H04L 5/0048; H04L 5/0053;
(Continued)

(56) References Cited

U.S. PATENT DOCUMENTS

| | | | |
|---|---|---|---|
| 2010/0322097 A1* | 12/2010 | Jen | H04L 1/1854 370/252 |
| 2012/0195271 A1* | 8/2012 | Lee | H04L 5/0048 370/329 |

(Continued)

FOREIGN PATENT DOCUMENTS

| | | |
|---|---|---|
| CN | 102742238 | 10/2012 |
| CN | 104485984 | 4/2015 |

(Continued)

OTHER PUBLICATIONS

Ericsson, "On multiplexing of RS types for downlink," 3GPP TSG-RAN WG1 #89ah-NR, R1-1711040, Jun. 2017, 2 pages.
(Continued)

*Primary Examiner* — Stephen J Clawson
(74) *Attorney, Agent, or Firm* — Lee Hong Degerman Kang & Waimey

(57) ABSTRACT

The present specification provides a method for multiplexing a demodulation reference signal (DMRS) and a channel state information-reference signal (CSI-RS) in a wireless communication system. Specifically, a method performed by a terminal may comprise the steps of: receiving a DMRS from a base station; and receiving a CSI-RS from the base station, wherein frequency-division multiplexing (FDM)
(Continued)

between the DMRS and the CSI-RS in a particular symbol is determined on the basis of a DMRS type.

7 Claims, 13 Drawing Sheets

(52) U.S. Cl.
CPC .......... *H04L 5/0048* (2013.01); *H04L 5/0051* (2013.01); *H04L 5/0053* (2013.01)

(58) Field of Classification Search
CPC ....... H04L 5/00; H04L 5/0007; H04L 5/0051; H04W 72/04
See application file for complete search history.

(56) References Cited

U.S. PATENT DOCUMENTS

| | | | |
|---|---|---|---|
| 2012/0207105 A1* | 8/2012 | Geirhofer | H04L 5/0051 370/329 |
| 2013/0053083 A1* | 2/2013 | Suh | H04L 5/0007 455/517 |
| 2013/0223332 A1* | 8/2013 | Wu | H04W 72/0446 370/315 |
| 2014/0334408 A1 | 11/2014 | Gao et al. | |
| 2015/0229450 A1* | 8/2015 | Noh | H04L 5/0035 370/329 |
| 2015/0381395 A1 | 12/2015 | Guo et al. | |
| 2016/0043792 A1* | 2/2016 | Jeong | H04B 7/0862 370/328 |
| 2016/0043842 A1* | 2/2016 | Gong | H04L 5/0048 370/329 |
| 2016/0087774 A1 | 3/2016 | Guo et al. | |
| 2019/0037562 A1* | 1/2019 | Park | H04L 5/00 |
| 2020/0112359 A1* | 4/2020 | Park | H04L 5/0044 |
| 2021/0274537 A1* | 9/2021 | Lee | H04W 72/1289 |

FOREIGN PATENT DOCUMENTS

| | | |
|---|---|---|
| EP | 3683996 | 7/2020 |
| KR | 20160143561 | 12/2016 |

OTHER PUBLICATIONS

The State Intellectual Property Office of the People's Republic of China Application Serial No. 201880059732.4, Office Action dated Dec. 20, 2021, 9 pages.
European Patent Office Application Serial No. 18835763.6, Search Report dated Mar. 4, 2021, 12 pages.
Qualcomm Inc., "On multiplexing of different types of RSs," 3GPP TSG RAN WG1 NR Ad-Hoc#2, R1-1711167, Jun. 2017, 5 pages.
Nokia, et al., "On CSI-RS Design for DL Beam Manangement," 3GPP TSG RAN WG1 #88, R1-1703179, Feb. 2017, 14 pages.
ZTE, "Discussion on multiplexing of different RSs," 3GPP TSG RAN WG1 Meeting #90, R1-1712302, Aug. 2017, 6 pages.
Huawei, et al., "Summary of views on multiplexing of different types of RS," 3GPP TSG-RAN WG1 NR Ad Hoc Meeting, R1-1711974, Jun. 2017, 9 pages.
Nokia et al., "On Multiplexing of Different RS Types," 3GPP TSG-RAN WG1 NR AH#2, R1-1711302, Jun. 2017, 6 pages.
CATT, "Discussion on RS multiplexing," 3GPP TSG-RAN WG1 NR Ad-Hoc#2, R1-1710064, Jun. 2017, 5 pages.
PCT International Application No. PCT/KR2018/008304, International Searching Authority dated Oct. 29, 2018, 4 pages.

* cited by examiner

【Figure 1】
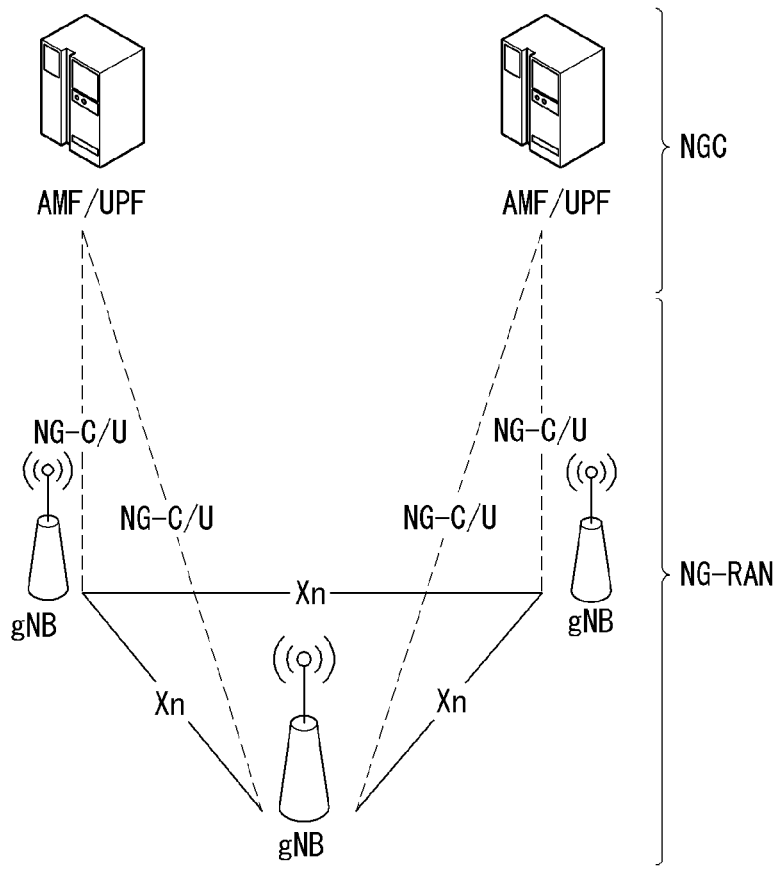
【Figure 2】
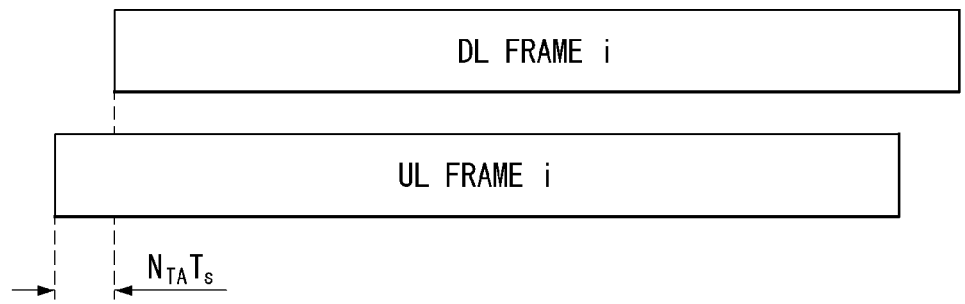

[Figure 3]
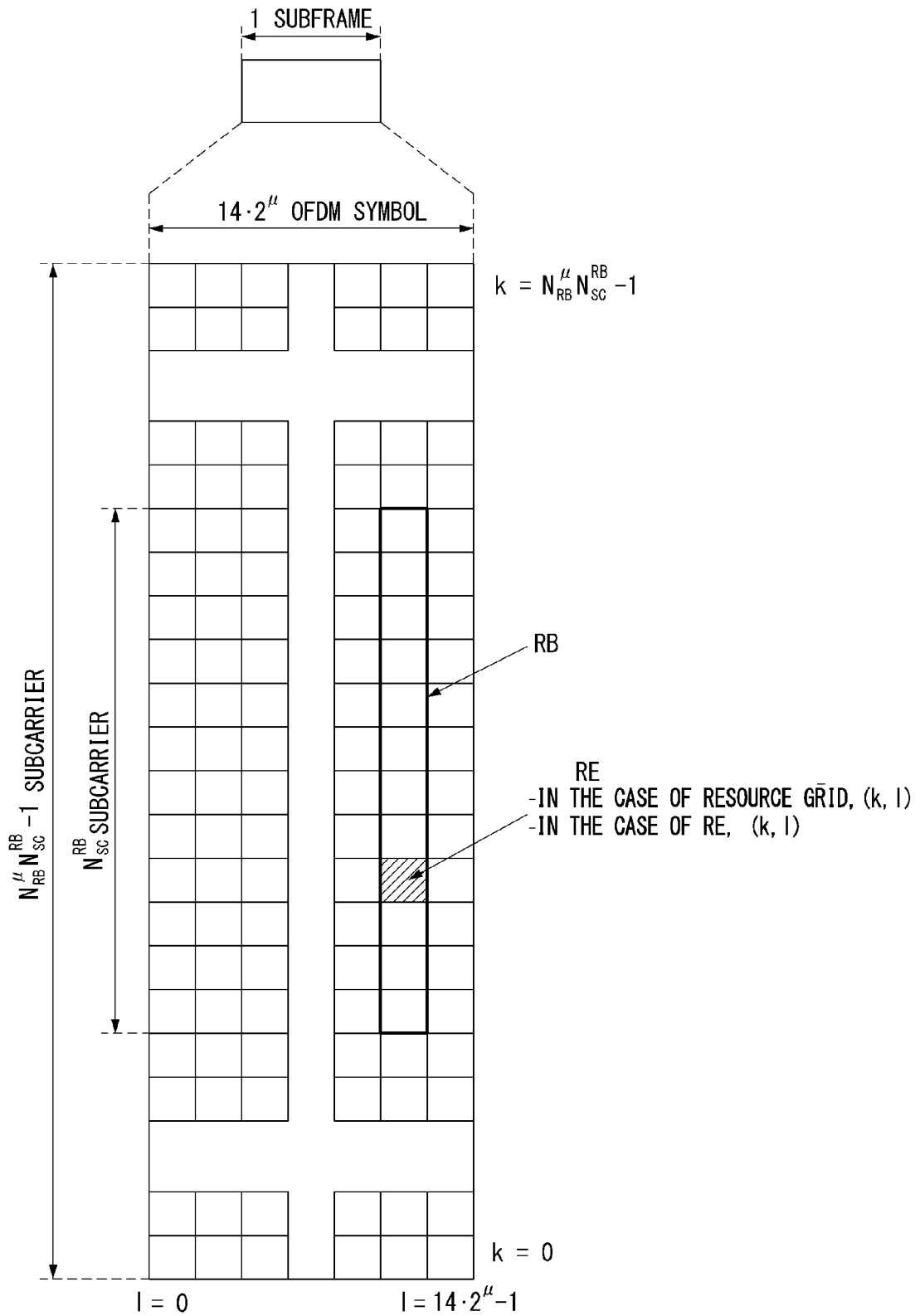

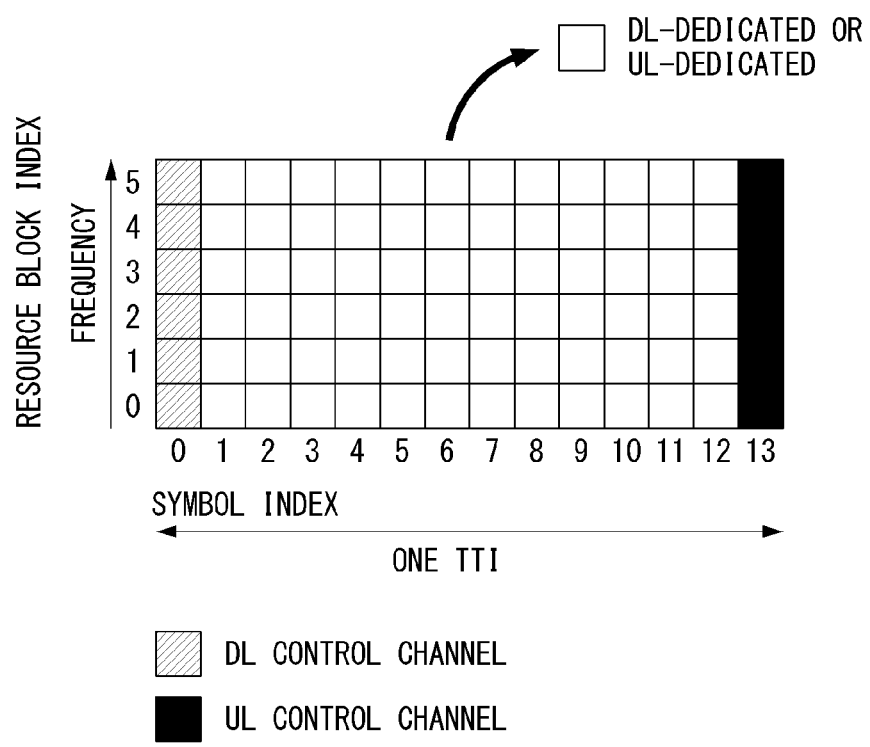
[Figure 4]

【Figure 5】
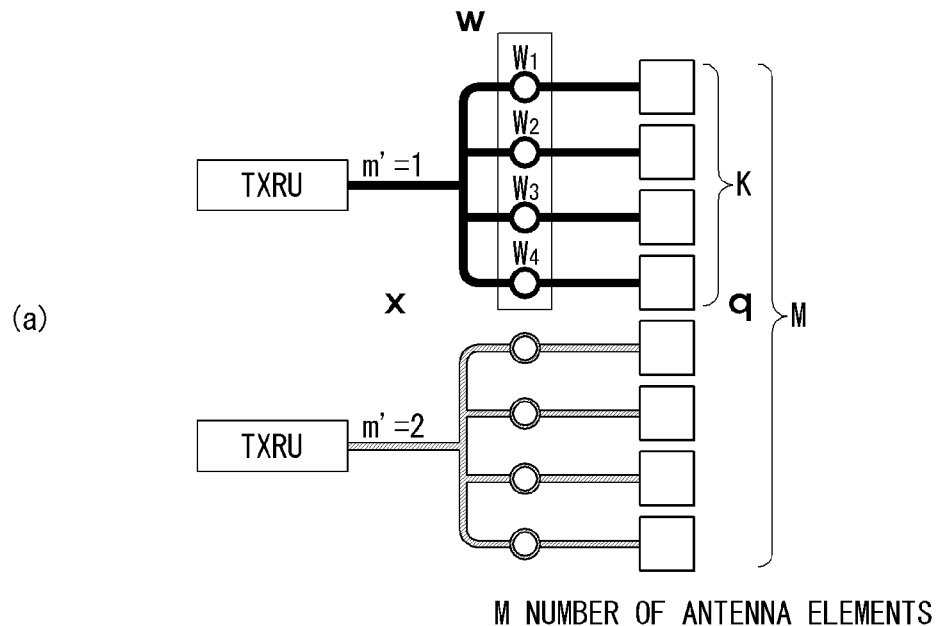
(a)
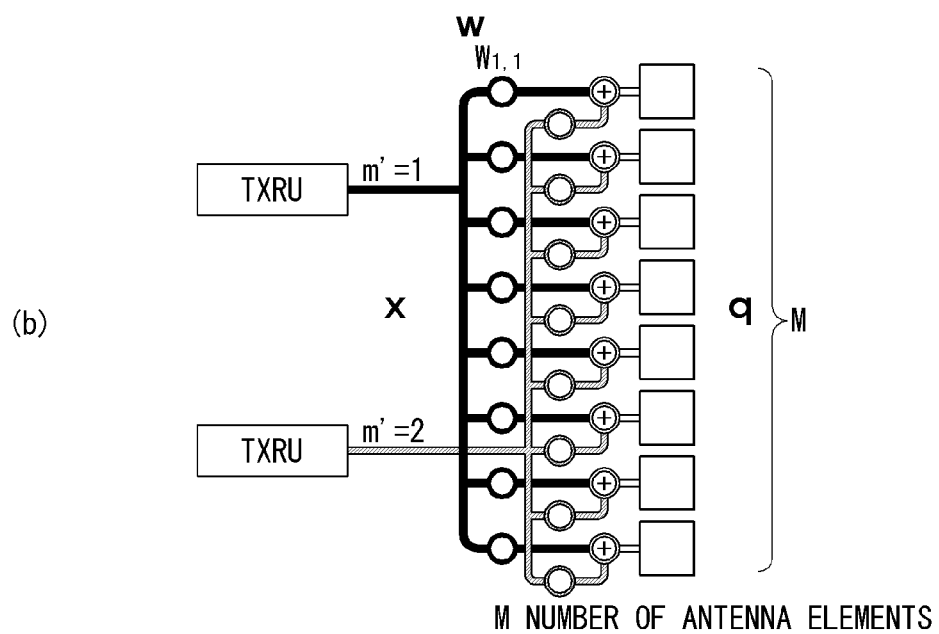
(b)

[Figure 6]
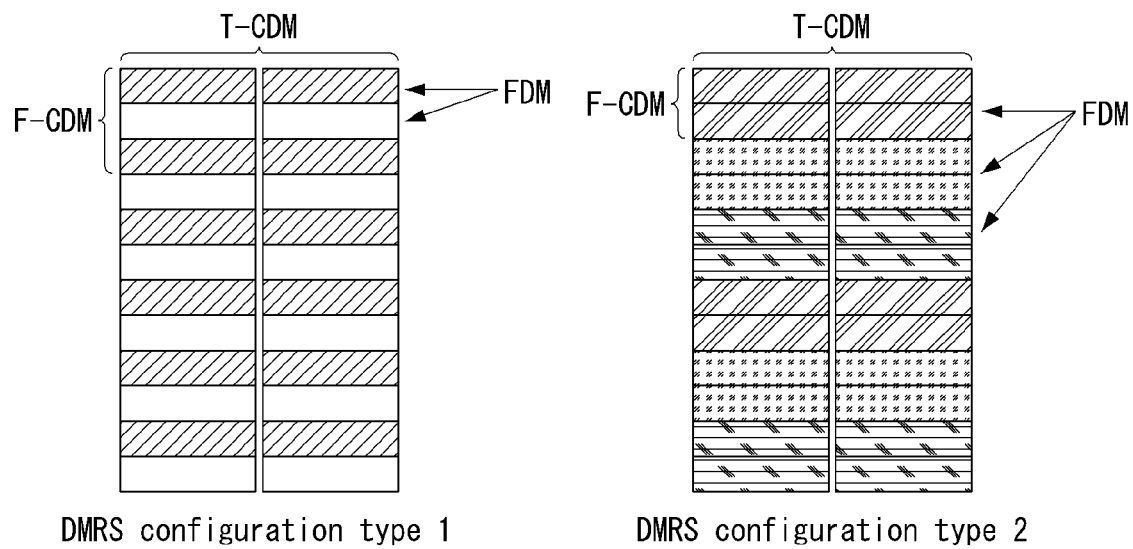

[Figure 7]
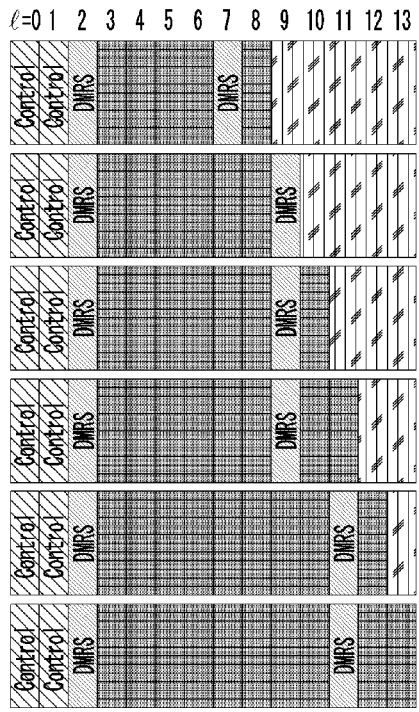
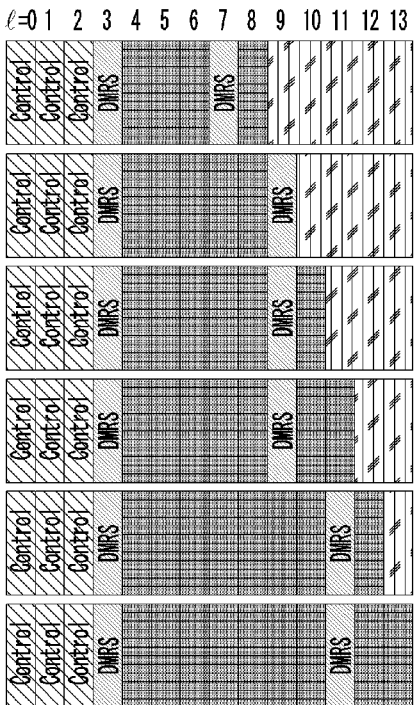
dmrs-TypeA-Position=3
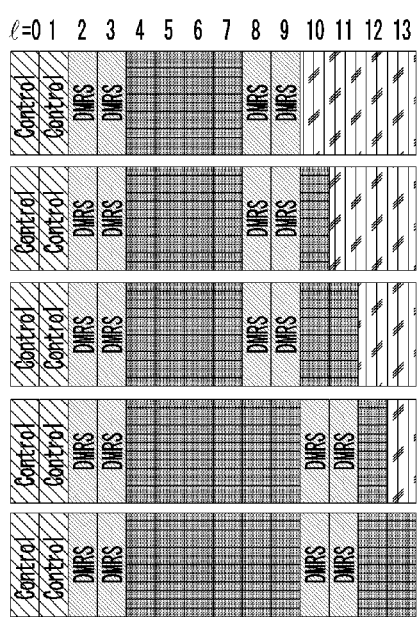
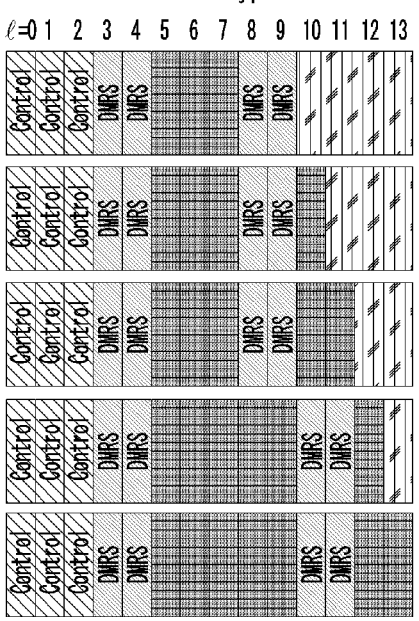

[Figure 8]
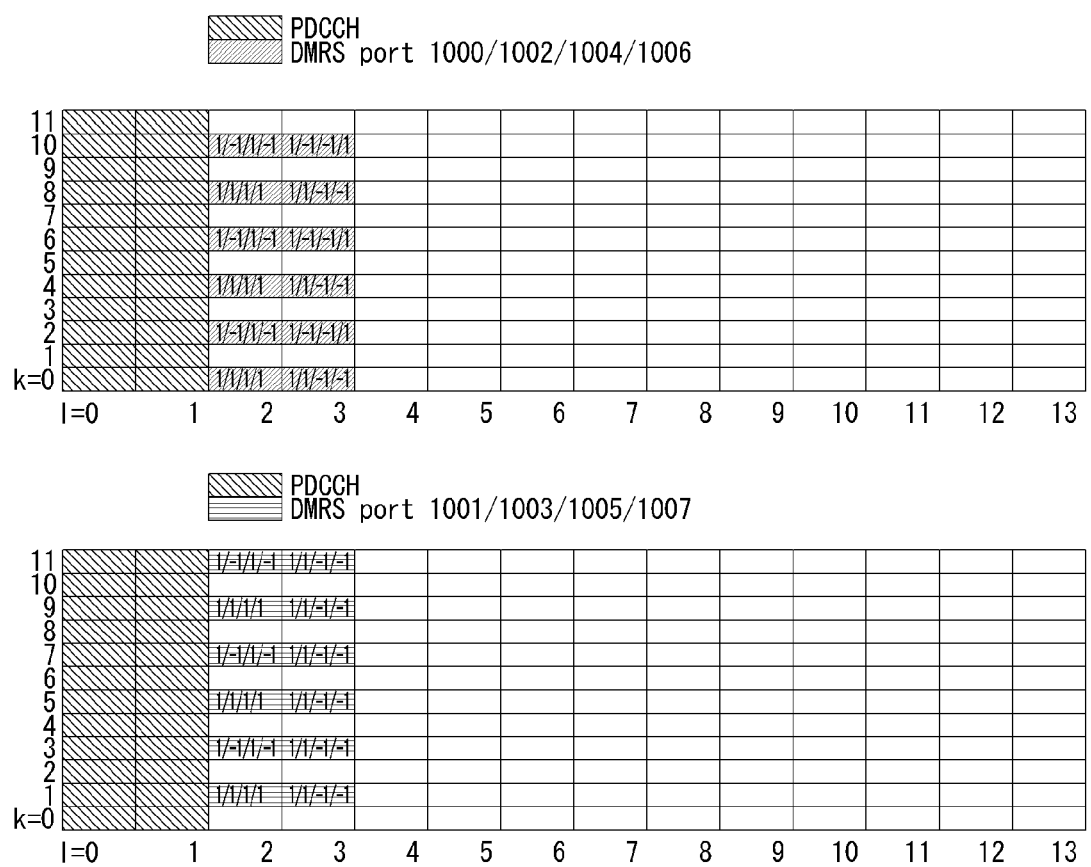

[Figure 9]
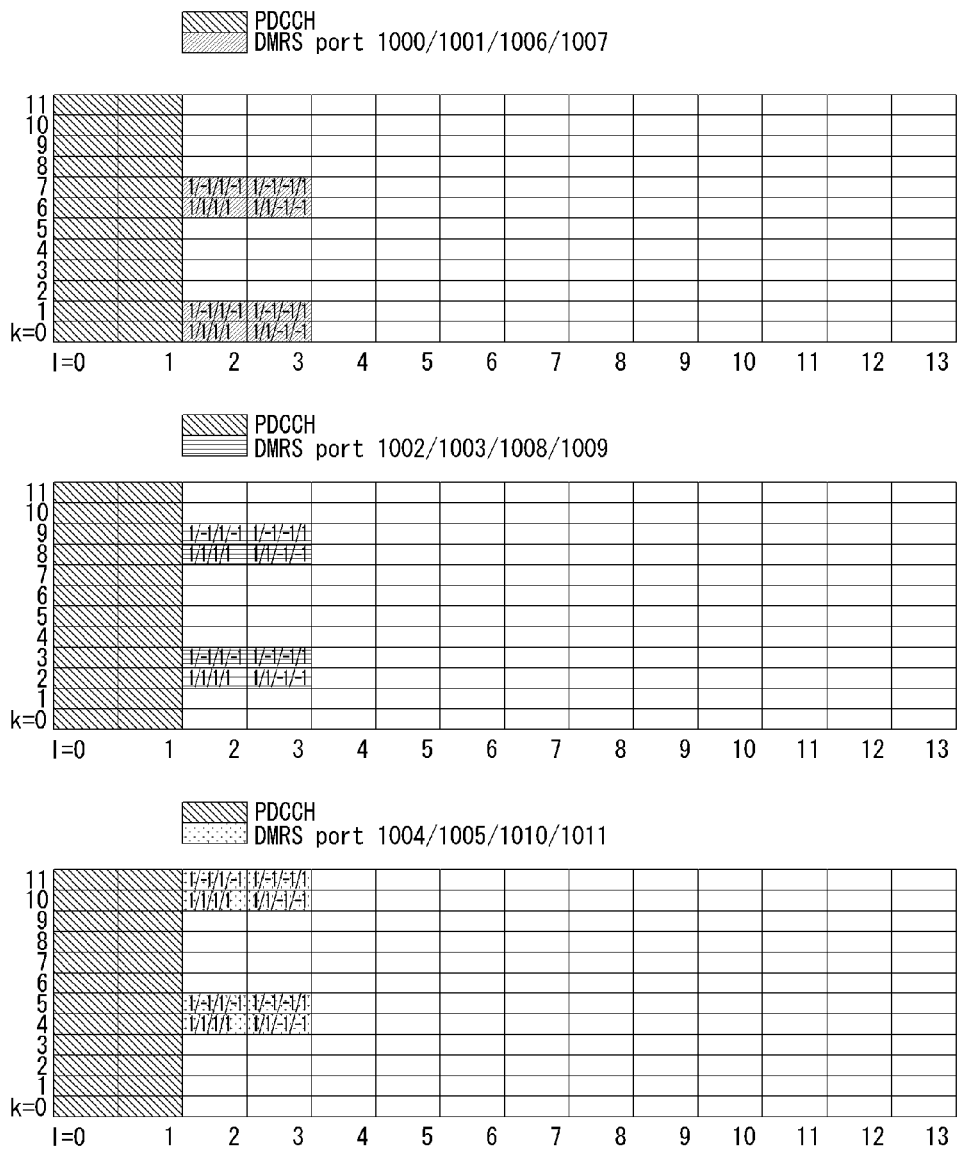

【Figure 10】
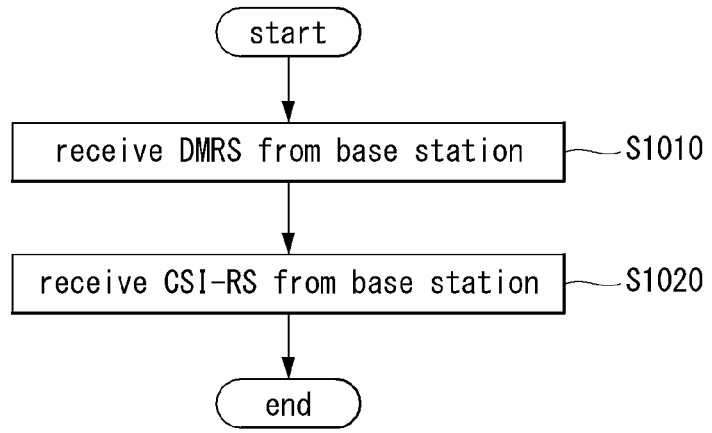
【Figure 11】
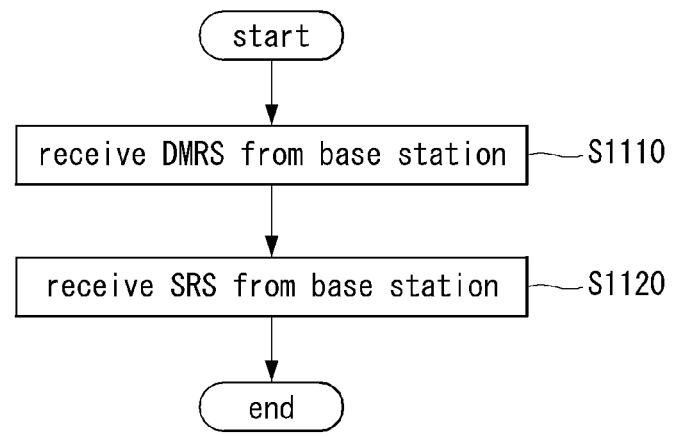

【Figure 12】
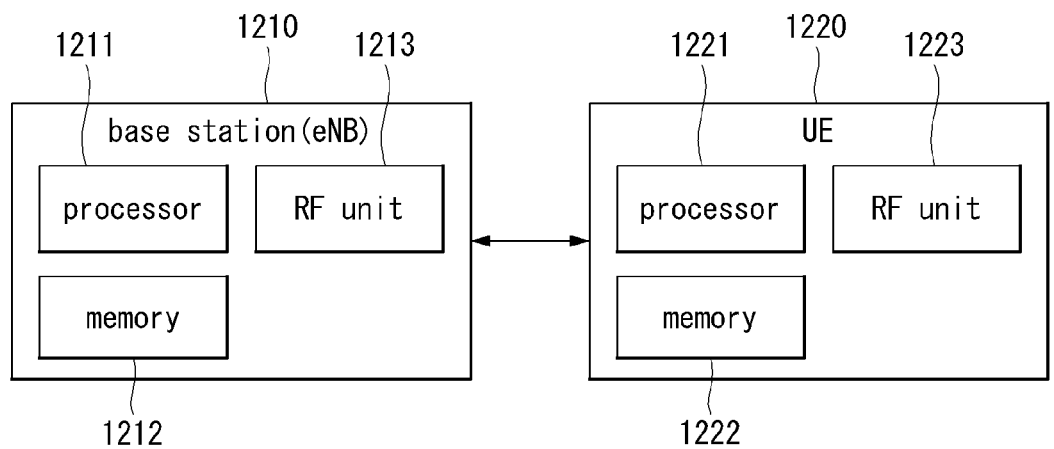

[Figure 13]
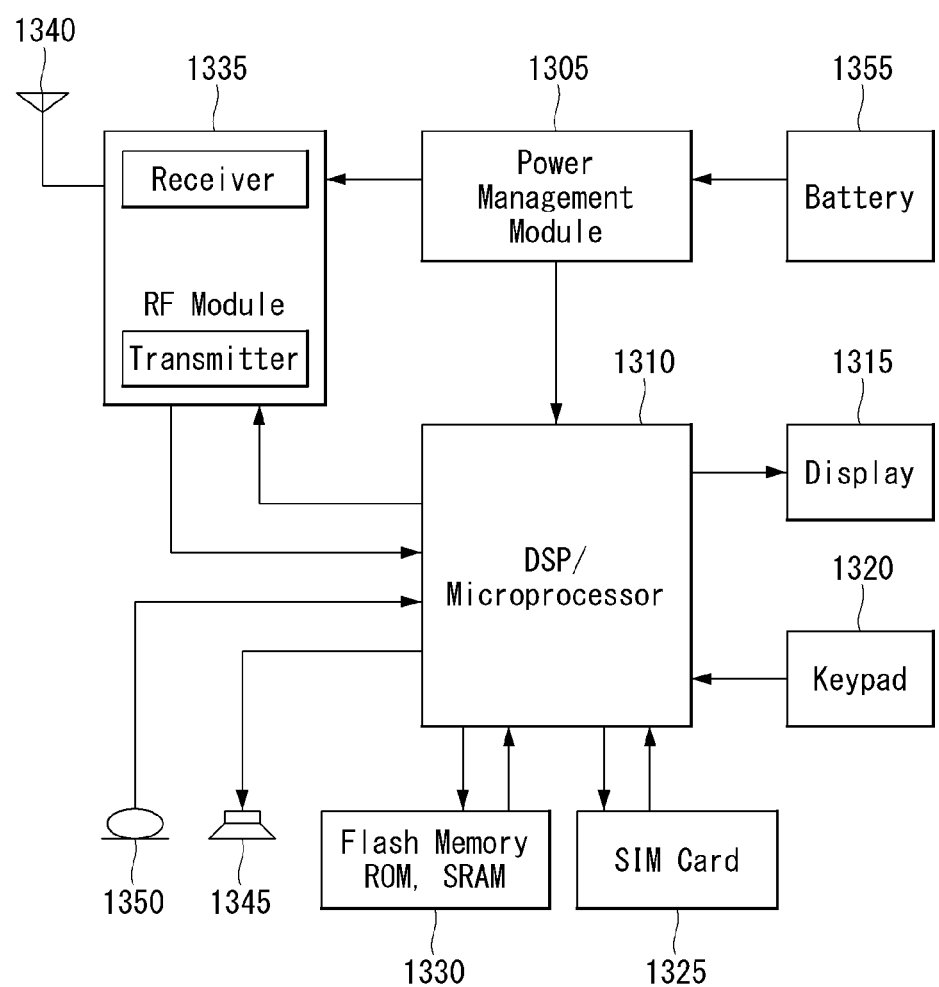

【Figure 14】
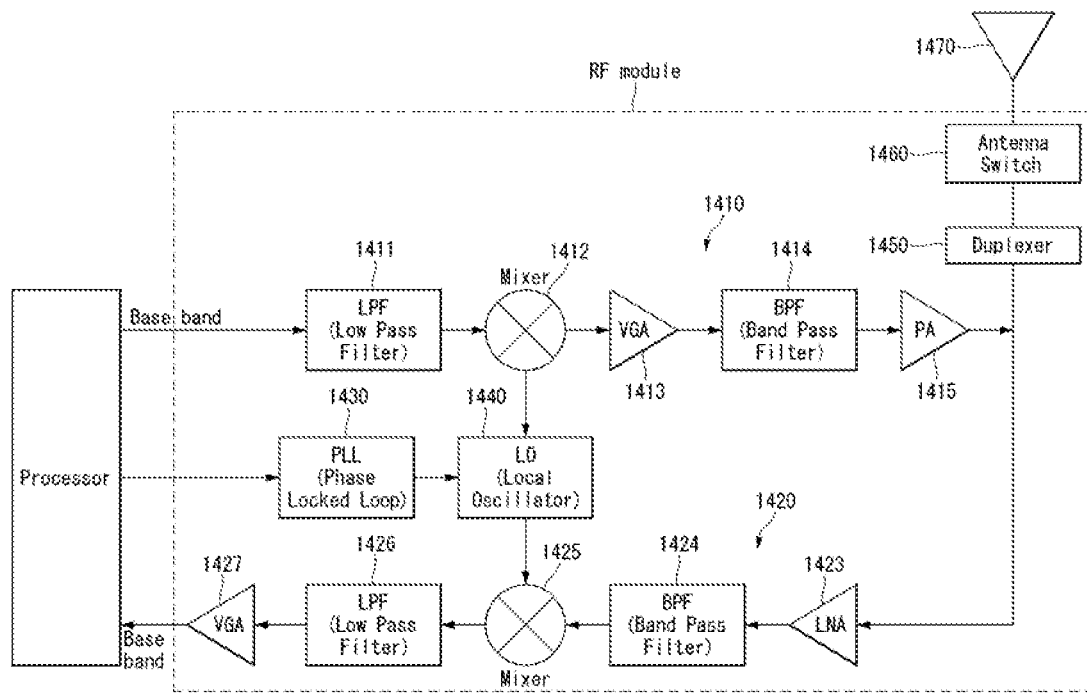

[Figure 15]
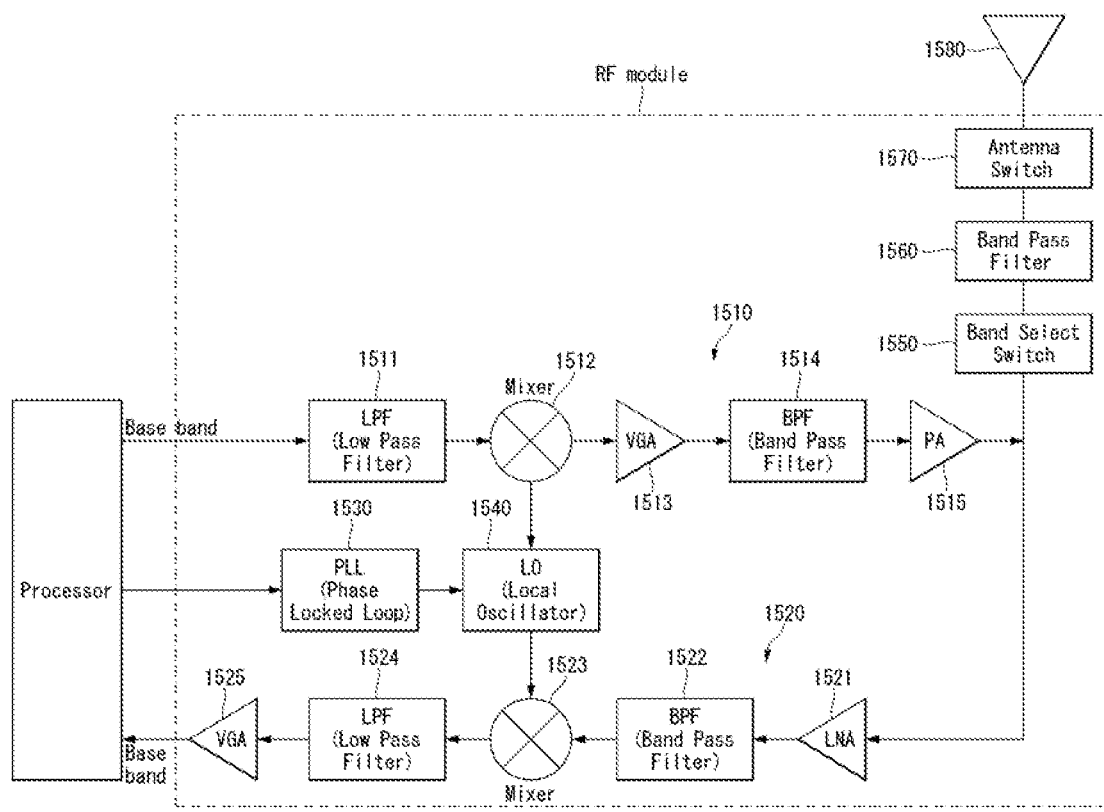

METHOD FOR MULTIPLEXING BETWEEN REFERENCE SIGNALS IN WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2018/008304, filed on Jul. 23, 2018, which claims the benefit of U.S. Provisional Application No. 62/535,244, filed on Jul. 21, 2017, the contents of which are all hereby incorporated by reference herein in their entirety.

TECHNICAL FIELD

The disclosure relates to wireless communication systems, and more specifically, to a method for performing multiplexing between a demodulation reference signal (DMRS) and a specific reference signal and apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DETAILED DESCRIPTION OF THE DISCLOSURE

Technical Problem

The disclosure aims to provide a method for supporting frequency division multiplexing (FDM) between a DMRS and a channel state information-reference signal (CSI-RS).

The disclosure also aims to provide a method for supporting frequency division multiplexing (FDM) between a DMRS and a sounding reference signal (SRS).

Objects of the disclosure are not limited to the foregoing, and other unmentioned objects would be apparent to one of ordinary skill in the art from the following description.

Technical Solution

The disclosure provides a method of multiplexing between reference signals in a wireless communication system.

Specifically, a method for multiplexing a demodulation reference signal (DMRS) and a channel state information-reference signal (CSI-RS) in a wireless communication system, which is performed by a user equipment (UE), comprises receiving the DMRS from a base station and receiving the CSI-RS from the base station, wherein frequency division multiplexing (FDM) between the DMRS and the CSI-RS in a specific symbol is determined based on a DMRS type.

Further, in the disclosure, the DMRS type is DMRS type 1 or DMRS type 2.

Further, in the disclosure, when the DMRS type is set to DMRS type 1, and the CSI-RS is set for a specific purpose, the DMRS and the CSI-RS may be FDMed in the specific symbol.

Further, in the disclosure, the specific purpose is a beam management purpose or a tracking reference signal (TRS) purpose.

Further, in the disclosure, the specific purpose is differentiated by an indicator included in RRC signaling.

Further, in the disclosure, when the DMRS type is set to DMRS type 2, the DMRS and the CSI-RS are FDMed in the specific symbol.

Further, in the disclosure, a method for multiplexing a demodulation reference signal (DMRS) and a sounding reference signal (SRS) in a wireless communication system, which is performed by a user equipment (UE), comprises transmitting the DMRS to a base station and transmitting the SRS to the base station, wherein frequency division multiplexing (FDM) between the DMRS and the SRS in a specific symbol is determined based on a DMRS type.

Further, in the disclosure, a user equipment (UE) for multiplexing a demodulation reference signal (DMRS) and a channel state information-reference signal (CSI-RS) in a wireless communication system comprises a radio frequency (RF) module for transmitting/receiving a radio signal and a processor functionally connected with the RF module, wherein the processor is configured to receive the DMRS from a base station and receive the CSI-RS from the base station, wherein frequency division multiplexing (FDM) between the DMRS and the CSI-RS in a specific symbol is determined based on a DMRS type.

Advantageous Effects

The disclosure supports methods of frequency division multiplexing between reference signals, thereby allowing for efficient use of resources.

Effects of the disclosure are not limited to the foregoing, and other unmentioned effects would be apparent to one of ordinary skill in the art from the following description.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 is a view illustrating an example overall NR system structure to which a method as proposed in the disclosure may apply.

FIG. 2 illustrates the relationship between an uplink frame and downlink frame in a wireless communication system to which a method as proposed in the disclosure may apply.

FIG. 3 illustrates an example resource grid supported in a wireless communication system to which a method as proposed in the disclosure may apply.

FIG. 4 illustrates an example self-contained subframe to which a method as proposed in the disclosure may apply.

FIG. 5 illustrates an example transceiver unit model in a wireless communication system to which the disclosure may apply.

FIG. 6 illustrates an example DMRS type.

FIG. 7 illustrates an example DMRS position.

FIG. 8 is a view illustrating an example pattern for DMRS type 1 as proposed in the disclosure.

FIG. 9 illustrates an example pattern for DMRS type 2 as proposed in the disclosure.

FIG. 10 is a flowchart illustrating an example method of operation of a UE for multiplexing a DMRS and a CSI-RS as proposed in the disclosure.

FIG. 11 is a flowchart illustrating a method of operation of a UE for multiplexing a DMRS and an SRS as proposed in the disclosure.

FIG. 12 is a block diagram illustrating a configuration of a wireless communication device to which methods proposed according to the disclosure are applicable.

FIG. 13 is a block diagram illustrating a configuration of a communication device according to an embodiment of the disclosure.

FIG. 14 is a view illustrating an example RF module of a wireless communication device to which a method proposed herein is applicable.

FIG. 15 is a view illustrating another example RF module of a wireless communication device to which a method proposed herein is applicable.

BRIEF DESCRIPTION OF DRAWINGS

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: Anode for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, and $\Delta f_{max}=480 \cdot 10^3$, and $N_f=4096$. DL and UL transmission is configured as a radio frame having a section of $T_f=(\Delta f_{max}N_f/100)\cdot T_s=10$ ms. The radio frame is composed of ten subframes each having a section of $T_{sf}=(\Delta f_{max}N_f/1000)\cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology $\mu$, slots are numbered in ascending order of $n_s^{\mu} \in \{0, \ldots, N_{subframe}^{slots,\mu}-1\}$ in a subframe, and in ascending order of $n_{s,f}^{\mu} \in \{0, \ldots, N_{frame}^{slots,\mu}-1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu}N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{RB}^{sc}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k,l̄). Herein, k=0, ..., $N_{RB}^{\mu}N_{sc}^{RB}-1$ is an index in the frequency domain, and l̄=0, ... $2^{\mu}N_{symb}^{(\mu)}-1$ indicates a location of a symbol in a subframe. To indicate a resource element in a slot, the index pair (k,l̄) is used. Herein, l=0, ..., $N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model.

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which can be implemented in a variety of hardware forms.

Demodulation Reference Signal (DMRS) for PUSCH

First, sequence generation for DMRS is described.

Where transform precoding for PUSCH is not enabled (that is, in the case of CP-OFDM), reference signal sequence r(m) is generated by Equation 2 below.

$$r(m) = \frac{1}{\sqrt{2}}(1 - 2 \cdot c(2m)) + j\frac{1}{\sqrt{2}}(1 - 2 \cdot c(2m + 1)) \quad [\text{Equation 2}]$$

Where transform precoding for PUSCH is enabled (that is, in the case of DFT-s-OFDM), reference signal sequence r(m) is generated by Equation 3 below.

$$r(m) = e^{-j\frac{\pi q m(m+1)}{L}} \quad [\text{Equation 3}]$$

Next, mapping to physical resources is described.

As given by higher layer signaling, a PUSCH DM-RS is mapped to physical resources according to (DMRS configuration) type 1 or 2.

For PUSCH DM-RS type 1, the sequence r(m) is to be mapped to physical reference elements by Equation 4 below.

$$a_{k,l}^{(p,\mu)} = e^{j\varphi_k} \cdot w_t(l') \cdot r(m+m_0)$$

$$k = k_0 + 2m + \Delta$$

$$l = l_0 + l' \quad [\text{Equation 4}]$$

In Equation 4, l', $w_t(l')$, $\varphi_k$ and $\Delta$ are given by Table 4 below.

For PUSCH DM-RS type 2, the sequence r(m) is to be mapped to physical resources by Equation 5 below.

$$a_{k,l}^{(p,\mu)} = w_f(k') \cdot w_t(l') \cdot r(m+m_0)$$

$$k = k_0 + 6m + k' + \Delta$$

$$l = l_0 + l' \quad [\text{Equation 5}]$$

Here, $w_f(k')$, $w_t(l')$, and $\Delta$ are given by Table 5 below, and PUSCH DM-RS type 2 is not supported when transform precoding for PUSCH is enabled.

Quantity ($l_0$) is defined relative to the start of PUSCH transmission.

Table 4 represents example parameters for PUSCH DM-RS type 1.

TABLE 4

| Antenna port | | | $w_t(l') = [w_t(0)\ w_t(1)]$ | |
|---|---|---|---|---|
| p | $\Delta$ | $\varphi_k$ | One symbol | Two symbol |
| 1000 | 0 | 0 | [+1] | [+1 +1] |
| 1001 | 1 | 0 | [+1] | [+1 +1] |
| 1002 | 0 | π(k mod2) | [+1] | [+1 +1] |
| 1003 | 1 | π(k mod2) | [+1] | [+1 +1] |
| 1004 | 0 | 0 | — | [+1 −1] |
| 1005 | 1 | 0 | — | [+1 −1] |
| 1006 | 0 | π(k mod2) | — | [+1 −1] |
| 1007 | 1 | π(k mod2) | — | [+1 −1] |

Table 5 represents example parameters for PUSCH DM-RS type 2.

TABLE 5

| Antenna port | | $w_f(l') = [w_f(0)\ w_f(1)]$ | $w_t(l') = [w_t(0)\ w_t(1)]$ | |
|---|---|---|---|---|
| p | $\Delta$ | | One symbol | Two symbol |
| 1000 | 0 | [+1 +1] | [+1] | [+1 +1] |
| 1001 | 0 | [+1 −1] | [+1] | [+1 +1] |
| 1002 | 2 | [+1 +1] | [+1] | [+1 +1] |
| 1003 | 2 | [+1 −1] | [+1] | [+1 +1] |
| 1004 | 4 | [+1 +1] | [+1] | [+1 +1] |
| 1005 | 4 | [+1 −1] | [+1] | [+1 +1] |
| 1006 | 0 | [+1 +1] | — | [+1 −1] |
| 1007 | 0 | [+1 −1] | — | [+1 −1] |
| 1008 | 2 | [+1 +1] | — | [+1 −1] |
| 1009 | 2 | [+1 −1] | — | [+1 −1] |
| 1010 | 4 | [+1 +1] | — | [+1 −1] |
| 1011 | 4 | [+1 −1] | — | [+1 −1] |

DMRS for PDSCH

First, a DMRS sequence for PDSCH is generated by Equation 6 below.

In other words, the UE assumes that the reference signal sequence r(m) is defined by Equation 6 below.

$$r(m) = \frac{1}{\sqrt{2}}(1 - 2 \cdot c(2m)) + j\frac{1}{\sqrt{2}}(1 - 2 \cdot c(2m + 1)) \quad [\text{Equation 6}]$$

Next, mapping to physical resources is described.

As given by higher layer signaling, the UE assumes that a PDSCH DMRS is mapped to physical resources according to (DMRS configuration) type 1 or 2.

For PDSCH DM-RS type 1, the sequence r(m) is to be mapped to physical reference elements by Equation 4 above.

For PDSCH DM-RS type 2, the sequence r(m) is to be mapped to physical resources by Equation 5 above.

For Equation 5 above, in the case of PDSCH DMRS, quantity ($l_0$) relies on a specific higher layer parameter, For PDSCH mapping type A, in the case of $N_{RB,DL}^{max}$, $\mu \leq X$, $l_0=4$, otherwise $l_0=3$, For PDSCH mapping type B, $l_0$ is defined so that DMRS is mapped to the OFDM symbol right after the CORESET where PDCCH scheduling associated with PDSCH transmission has been detected.

CSI Reporting

NR supports the following three time-domain behaviors in relation to CSI reporting.

Similarly, reporting for (analog) beam management may also support all or some of the three time-domain behaviors.

(1) Aperiodic CSI Reporting

CSI reporting is performed only upon triggering.

(2) Semi-Persistent CSI Reporting

If activated, CSI reporting starts (in a specific period) and, if deactivated, CSI reporting stops.

(3) Periodic CSI Reporting

CSI reporting is performed with the slot offset and periodicity set by RRC.

Further, upon CSI acquisition, DL RS (downlink reference signal) for channel measurement may support three time-domain behaviors as follows. Similarly, DL RS for beam management may also support all or some of the three time-domain behaviors.

In DL RS for beam management, CSI-RS may be included as default, and other downlink signals are also likely to be utilized.

As other example downlink signals, mobility RS, beam RS, synchronization signal (SS), SS block, DL DMRSs (e.g. PBCH DMRS, PDCCH DMRS) may be utilized.

(1) Aperiodic CSI-RS

CSI-RS measurement is performed only when triggered (2) Semi-Persistent CSI-RS

If activated, CSI-RS measurement starts (in a specific period) and, if deactivated, CSI-RS measurement stops.

(3) Periodic CSI-RS

CSI-RS measurement is performed with the slot offset and periodicity set by RRC.

Further, upon CSI acquisition, zero-power (ZP) CSI-RS-based interference measurement schemes that used to be used for LTE may be supported for the interference measurement resource (IMR) that the base station designates for the UE.

Further, at least one of non-zero-power (NZP) CSI-RS-based interference measurement scheme or DMRS-based interference measurement scheme may be supported.

In particular, while in LTE system ZP CSI-RS-based IMR is configured semi-statically (via RRC signaling), a dynamically configuring scheme is scheduled to be supported in NR. Also, the following three time-domain behaviors may be supported.

(1) Aperiodic IMR with ZP CSI-RS
(2) Semi-persistent IMR with ZP CSI-RS
(3) Periodic IMR with ZP CSI-RS Thus, available are combinations of various time domain behaviors, as follows, for channel estimation, interference estimation, and reporting constituting CSI measurement and reporting. (hereinafter, AP: aperiodic, SP: semi-persistent, and PR: periodic)

Ex1) AP CSI reporting with AP/SP/PR NZP CSI-RS for channel measurement and AP/SP/PR ZP CSI-RS for interference measurement Ex2) SP CSI reporting with SP/PR NZP CSI-RS for channel measurement and SP/PR ZP CSI-RS for interference measurement Ex3) PR CSI reporting with PR NZP CSI-RS for channel measurement and PR ZP CSI-RS for interference measurement In the above examples, AP RS/IMR, SP RS/IMR, and PR RS/IMR have been assumed to be used only for AP reporting, only for AP or SP reporting, and for all reporting, respectively. However, the disclosure is not limited thereto.

Further, RS and IMR both are included in resource setting, and their purposes, i.e., whether they are for channel estimation or for interference estimation, may be indicated via a setting for each link.

Further, the bandwidth (BW) of CSI-RS may carry not only the legacy wideband CSI-RS but also another RS known as the partial band CSI-RS.

Here, the partial band may be defined in bandwidth part (BWP) units which are frequency units with the same numerology (e.g., subcarrier spacing) or for some PRB sets in the BWP.

Such CSI-RS band configuration may be indicated by a resource setting which is an RRC layer message.

Described below is a frequency division multiplexing (FDM) method between a DMRS and a specific RS (e.g., CSI-RS or SRS) as proposed in the disclosure.

The NR system supports two DMRS types depending on frequency domain patterns. This is described in detail with reference to FIG. 6.

FIG. 6 illustrates an example DMRS type.

The number of DMRS symbols may be one, two, or more.

In the NR system, the number of symbols included in one slot may be 14, or 7 or less (in the case of mini-slots) or others.

The mini-slot means a slot constituted of 2, 4, or 7 symbols.

In a slot constituted of 14 or 7 symbols, the symbol position of the first DMRS for physical downlink shared channel (PDSCH) or physical uplink shared channel (PUSCH) demodulation may be determined to be the third or fourth symbol position depending on the system bandwidth.

The second DMRS symbol may be transmitted immediately behind the first DMRS symbol or may be omitted.

Separately from the one-symbol or two-symbol DMRS (known as 'front-loaded DMRS'), a DMRS known as 'additional DMRS' may be additionally transmitted in the middle or later part of the slot) for, e.g., high Doppler UE.

The DMRS design (or configuration) method may apply to both downlink (DL) and uplink (UL).

The above-described DMRS design method is also applicable to sidelink (SL) later.

The SL DMRS may follow the properties of UL DMRS in light that it is a DMRS the UE transmits.

In other words, the UL DMRS-related technology as proposed in the disclosure is applicable to SL DMRS.

FIG. 7 illustrates an example DMRS position.

Described below is multiplexing, specifically frequency domain multiplexing (FDM), between DL DMRS and CSI-RS and between UL DMRS and SRS in the same symbol.

DMRS type 1 supports up to eight ports, and the position and cover code value ($w_f(k') \cdot w_t(l)$) of each DMRS port in the PRB are as shown in FIG. 8, for example.

Assumed in FIG. 7 are a slot including 14 symbols, two-symbol front-load DMRS, and no additional DMRS.

FIG. 8 is a view illustrating an example pattern for DMRS type 1 as proposed in the disclosure.

DMRS type 2 supports up to 12 ports and is under the same assumption given for FIG. 8.

FIG. 9 illustrates an example pattern for DMRS type 2 as proposed in the disclosure.

Further, in the NR system, CSI-RS may be used not only for CSI acquisition (measurement and reporting) but also for measurement for layer 3 mobility (e.g., L3 RSRP), (analog) beam management (e.g., beam selection, selected beam ID and beam quality reporting), and fine time/frequency tracking (hereinafter, 'TRS') due to lack of LTE CRS.

Table 6 represents example CSI-RS RE patterns.

TABLE 6

| X | Density [RE/RB/port] | N | (Y, Z) | CDM |
|---|---|---|---|---|
| 1 | >1, 1, ½, ⅓ | 1 | N.A. | No CDM |
| 2 | 1, ½, ⅓ | 1 | (2, 1) | FD-CDM2 |
| 4 | 1, ½, ⅓ | 1 | (4, 1) | FD-CDM2 |
| 4 | 1, ½, ⅓ | 2 | (2, 2) | FD-CDM2, CDM4(FD2,TD2) |
| 8 | 1, ½, ⅓ | 1 | (2, 1) | FD-CDM2 |
| 8 | 1, ½, ⅓ | 2 | (2, 2) | FD-CDM2, CDM4(FD2, TD2) |
| 8 | 1, ½, ⅓ | 4 | (2, 2) | FD-CDM2, CDM8 |
| 12 | 1, ½, ⅓ | 1 | (2, 1) | FD-CDM2, FD-CDM4 |
| 12 | 1, ½, ⅓ | 2 | (2, 2) | FD-CDM2, CDM4(FD2, TD2) |
| 16 | 1, ½, ⅓ | 2 | (2, 2) | FD-CDM2, CDM4(FD2, TD2) |
| 16 | 1, ½, ⅓ | 4 | (2, 2) | FD-CDM2, CDM4(FD2, TD2), CDM8 |
| 24 | 1, ½, ⅓ | 2 | (2, 2) | FD-CDM2, FD-CDM4, CDM8 |
| 24 | 1, ½, ⅓ | 4 | (2, 2) | FD-CDM2, CDM4(FD2, TD2), CDM8 |
| 32 | 1, ½, ⅓ | 4 | (2, 2) | FD-CDM2, CDM4(FD2, TD2), CDM8 |

The CSI-RS pattern (or CSI-RS resource) and port configuration depending on each CSI-RS purpose may differ. Typically, the following assumption may be made.

(1) For CSI acquisition/mobility: up to 32 ports, frequency domain density (fD)=1, <1, (>1) [RE/PRB/port], time domain density (tD)=1 [RE/slot/port]

(2) For beam management (BM): up to two to eight ports, fD=1, >1, (<1), tD=1, >1

(3) For tracking reference signal (TRS): 1 port, fD>1, tD=1, >1

In other words, for beam management and TRS purposes, a relatively small maximum number of ports and a high frequency/time density of one or more are defined.

Here, the feature of tD>1 may include not only transmission of one CSI-RS resource in a plurality of symbols in the same slot but also transmission of a plurality of CSI-RS resources that are quasi-co-located (QCLed) with each other or transmit the same antenna port in different symbols in the same slot.

This extended scheme may commonly apply to what is described below.

In the case of legacy LTE system, the DMRS RE is always in a fixed position.

Thus, the resource element (RE) pattern where a CSI-RS is configurable is defined except for the DMRS RE position.

However, in the case of NR system, the DMRS RE may have a different position in the frequency domain depending on each port, and the position and number of DMRS symbols may be variable (in particular, more variable if even mini-slots are considered).

Therefore, many restrictions may be posed on determining the RE position where CSI-RS is configurable except for all possible DMRS RE positions.

Thus, it is needed to allow (or define) frequency domain multiplexing (FDM) in a specific (or the same) symbol between CSI-RS and (all or some) DMRSs.

FDM between DL DMRS and CSI-RS is described below in greater detail.

DMRS type 1 has the comb-2 structure in the frequency domain and, thus, does not allow FDM between CSI-RS and DMRS or may allow limited CSI-RS/DMRS FDM for (no frequency domain CDM-featured) 1-port CSI-RSs, some N-port CSI-RSs that use (Y,Z)=(1, 2 or larger integer) as the component RE pattern, or CSI-RSs configured for a specific purpose.

Here, Y denotes the number of adjacent REs in the frequency domain, and Z denotes the number of adjacent REs in the time domain.

The component RE pattern may be interpreted as meaning the resource constituting a CDM group.

The specific purpose may be a beam management or TRS purpose.

Where a CSI-RS is used for beam management, the CSI-RS may be configured via an RRC message constituted of a resource setting, a reporting setting, and a measurement setting.

The signaling framework may be utilized for CSI acquisition as well as for beam management.

The signaling framework indicates the relationship between the resource setting, reporting setting, and measurement setting and may also be represented as CSI framework.

Thus, the beam management-purpose CSI-RS may be differentiated explicitly with a purpose/type differentiator (or indicator) set for the resource setting or may be differentiated by reporting information configured in the reporting setting linked to the resource setting via the measurement setting.

For example, for the beam management purpose, some of, e.g., beam ID (e.g., CRI), CSI-RS/SS block-based L1 RSRP, and beam grouping information (e.g., CRI group ID) may be included in the reporting parameters.

For the CSI acquisition purpose, a combination of PMI, CQI, RI, and CRI may be configured.

In particular, there may be such an occasion where RS only without reporting information (no report, none) is transmitted for the UE's Rx beam selection purpose.

In other words, there may be no linked reporting setting or a resource setting which has a feature linked to the NULL setting may also indicate the beam management purpose.

By the above-described features, the purposes of CSI-RS may be differentiated implicitly.

The purposes of CSI-RS may also be differentiated by CSI-RS patterns or features.

For example, the purposes of CSI-RS may be differentiated implicitly by the feature of fd>1 (or a specific value) and/or td>1 (or a specific value).

Thus, it is allowed to configure a CSI-RS in the symbol where a DMRS symbol is transmittable restrictively to CSI-RS resources included in the resource setting with the features.

For example, the CSI-RS with the above-described features, among the resource settings, may be allowed to be transmitted in the third and/or fourth symbol if the system bandwidth is a predetermined value or less and in the fourth and/or fifth symbol if the system bandwidth is a predetermined value or more.

Or, transmission of a CSI-RS in the symbol position may be allowed only for 1-port CSI-RS resources or some N-port CSI-RSs that use (Y,Z)=(1, 2 or larger integer) as the component RE pattern.

TRS-purpose CSI-RSs may be configured separately from the resource settings or may be included in the resource settings and, similarly to CSI-RSs transmitted for the purpose of the UE's Rx beam selection, only RS may be transmitted without reporting, there may be no linked reporting setting or they may be implicitly differentiated by a feature linked to the NULL setting.

Or, the TRS-purpose CSI-RSs may be differentiated by the CSI-RS patterns or features.

For example, the TRS-purpose CSI-RSs may be differentiated implicitly by the feature of number of ports=1, fD>1 (or a specific value), and/or tD>1 (or a specific value).

Or, there may be included an indicator that they may be utilized for time/frequency tracking purposes.

This may be replaced with an indicator for the feature that they are QCLed between different CSI-RS symbols (or resources) transmitted in a single or multiple slots.

Since DMRS type 2 may use up to four consecutive REs per port in the frequency domain, a limitation may be imposed so that multiplexing with CSI-RS is allowed for all configurations or multiplexing with the CSI-RS is allowed only in a very special case.

Here, in the configuration of the CSI-RS excluded from multiplexing, five or more REs may be occupied in one symbol, or fD>1 and, in the inter-CSI-RS RE interval, there is a high chance of conflict or a conflict is unavoidable.

In such aspects, if the following conditions (or subsets of the following conditions) are met, the configuration for CSI-RS may be limited in the DMRS symbol position.

(1) N-port or more (2) N-port or more, plus where M or more (consecutive) component RE patterns are aggregated in the same symbol (set) (where M is an integer not less than two).

Where they are inconsecutively aggregated, FDM between DMRS and CSI-RS may be allowed (e.g., when there is an interval of 2 Res or larger)

(3) Specific CDM pattern/length:
  Where CDM-8 is configured (or applied), a specific CDM-8 type may be restricted to lower the chance of conflict.
  For example, only CDM-8 types which are constituted of (subcarriers, symbols)=(2, 4) are allowed while CDM-8 types constituted of (subcarriers, symbols)=(4, 2) are not.
  The above restriction may be limited to the cases where they are inconsecutively aggregated to constitute CDM-x (e.g., x=4 or 8).
  That is, it may be the case where CDM-x is configured over the component RE pattern.
  The configuration limitation to a specific CDM length (e.g., x=2) may be used for the purpose of minimizing interference with the DMRS of neighboring cell upon multiplexing.
(4) Specific fD value(s) meeting fD>1 (e.g., fD=2) are allowed (because the interval is 6 spacings if the distribution is assumed to be uniform), and fD=3 may not (because the interval is four spacings when the distribution is uniform).
  The limited fD values may be set to differ depending on the number of ports and RE patterns.

Next described in detail is FDM between UL DMRS and SRS.

In NR, the sounding reference signal (SRS) has a Comb structure in the frequency domain, and 1, 2, or 4 is used as the Comb value.

For the SRS, up to four symbols may be transmitted in one slot.

This is for, e.g., UL beam management or coverage limited UE.

In NR, the UL supports discrete fourier transform (DFT)-spread OFDM waveform as does the LTE UL (however, the maximum transmission rank is 1) and also supports CP OFDM waveform as does the DL (the maximum transmission rank is 4 to 8).

For the DFT-s OFDM waveform, only DMRS type 1, which has a comb structure may be used.

The SRS may be transmitted aperiodically only at once, (periodically) several times semi-persistently from the time of activation to the time of deactivation, or periodically by RRC configuration (always until RRC is configured or disconnected).

For all those cases, SRS symbol position, comb value, or comb offset may be (previously) set by, e.g., RRC or MAC CE.

At this time, symbol positions where an SRS is configurable may be set except for UL DMRS positions.

However, there may be many DMRS-configurable symbol positions and the number of symbols may be large and, when the cell is crowded with UEs, and when various slot structures including mini-slot are considered, it may be preferable to allow FDM between UL DMRS and SRS.

In other words, whether SRS transmission is allowed may be defined according to the following conditions in the DMRS symbol-transmittable position, i.e., the third, fourth, or x_ith position (i=1, . . . , X, X is the total number of symbols of the additional DMRS, and x_i is the symbol position of the ith additional DMRS) if the system bandwidth is a predetermined value or less and the fourth, fifth, or x_ith position (i=1, . . . , X, X is the total number of symbols of the additional DMRS, and x_i is the symbol position of the ith additional DMRS) if the system bandwidth is a predetermined value or more.
  For DMRS type 1, allowed only except for where SRS comb is 1
  For DMRS type 2, FDM with SRS is not allowed If SRS comb 6 is supported, comb 6 is allowed.

Additionally, if SRS is transmitted in two symbols or more in one slot, different SRSs may be transmitted in different RE positions (symbol-level hopping).

Upon symbol-level hopping, comb offset or PRB set may be varied.

Thus, given that a plurality of UL DMRS symbols may be transmitted together in such a case, SRS may be configured in a plurality of symbols and, if all or some of the symbols that may conflict with DMRS symbols are included in the SRS configuration, it may be more preferable to disable symbol-level SRS hopping or to allow only a specific hopping pattern.

For example, hopping may be configured with each two adjacent symbols bundled given that DMRS is transmittable adjacently in up to two symbols.

Or, such a configuration may be made so as to perform hopping only on PRB (set) with the comb value and comb offset maintained.

Given, e.g., the likelihood of inter-port FDM or power boosting along with those described above, it may be allowed to make SRS configuration in the DMRS symbol position only for p-port or less SRSs (where P is an integer not less than two).

P-port or more SRSs may not be allowed for multiplexing with DMRS, or FDM may be allowed only for a specific DMRS config. depending on the inter-port subcarrier interval.

For example, if UL DMRS type 1, SRS comb 4, and FDM is performed between #{1,2} ports and #{3,4} ports, SRS may be allowed to be FDMed in the DMRS symbol position only for the patterns where inter-port group subcarrier interval is 2.

Next, time domain behaviors of CSI-RS and SRS are described.

As described above, CSI-RS and SRS may have three time domain behaviors: aperiodic (one shot); semi-persistent (multi-shot); and periodic.

Whether to allow FDM with CSI-RS/SRS for all or some DMRS symbols and the degree may be set to differ depending on the time domain behaviors of CSI-RS/SRS in addition to considerations for whether to perform FDM in the aspects of DMRS, CSI-RS, and SRS RE pattern.

Since aperiodic CSI-RS/SRS is triggered by DCI, a configuration of FDM with CSI-RS/SRS in the DMRS symbol position (on the high layer configuration) may be allowed.

At this time, after a plurality of CSI-RS/SRS RE positions are configured in the high layer, pattern(s) where conflict is avoidable may be designated considering the pattern of DMRSs FDMed by MAC CE or DCI.

In particular, whether DMRS is transmitted in the second symbol of front-load DMRS may differ depending on the number of SU-MIMO layers or the context of MU-MIMO transmission.

Thus, such a pattern may be indicated that after all CSI-RS/SRS SE patterns are configured by RRC in the (first and) second symbol position of the front-load DMRS, conflict is avoided by DCI when transmitting aperiodic CSI-RS/SRS in the PDSCH where DMRS is transmitted in the second symbol.

The two DCIs may be transmitted in different PDCCHs (at different timings), rather than in the same PDCCH.

For example, aperiodic CSI-RS triggering may be indicated with UL DCI, and PDSCH allocation may be indicated by DL DCI.

If conflict cannot be avoided with a preset pattern, only one of the two may be received or transmitted by a predetermined priority rule between aperiodic CSI-RS/SRS and DMRS.

If the priority of DMRS is higher, CSI-RS/SRS is received/transmitted in other frequency domain than the conflicting frequency domain or the whole reception/transmission may not be performed.

Since periodic (and semi-persistent) CSI-RS/SRS has a high chance of conflict depending on the dynamically varying DMRS pattern, it may be more preferable to allow no configuration for CSI-RS/SRS in all or some DMRS symbol positions.

For example, if periodic CSI-RS/SRS configuration is not allowed in the first and/or second DMRS symbol position (fourth or fifth symbol) of the front-load DMRS, the base station may dynamically configure a DMRS without concern about conflict fitting the SU-MIMO, MU-MIMO transmission context.

In sum, a symbol position set configurable by RRC for aperiodic CSI-RS/SRS is rendered to be larger than a symbol position set configurable by RRC for periodic CSI-RS/SRS.

The above method may apply differently depending on DMRS types.

For example, multiplexing with CSI-RS is much easier in DL DMRS type 2 than in type 1.

Thus, where DL DMRS type 2 is configured, periodic CSI-RS may be configured in (all or some) DMRS symbol positions.

However, if DL DMRS type 1 is configured, periodic CSI-RS may be defined not to be configured in (all or some) DMRS symbol positions.

In contrast, multiplexing with SRS is much easier in UL DMRS type 1 than in DMRS type 2.

Thus, where UL DMRS type 1 is configured, periodic SRS is rendered to be configured in (all or some) DMRS symbol positions.

However, if UL DMRS type 2 is configured, periodic SRS may be rendered not to be configured in (all or some) DMRS symbol positions.

FIG. 10 is a flowchart illustrating an example method of operation of a UE for multiplexing a DMRS and a CSI-RS as proposed in the disclosure.

First, a UE receives a DMRS from a base station (S1010).

The type of the DMRS may be DMRS type 1 or DMRS type 2.

The UE receives a CSI-RS from the base station (S1020).

Here, frequency division multiplexing (FDM) between the DMRS and the CSI-RS in a specific symbol may be determined based on the DMRS type.

If the DMRS type is set to DMRS type 1, and the CSI-RS is set for a specific purpose, the DMRS and the CSI-RS may be FDMed in the specific symbol.

The specific purpose may be a beam management or tracking reference signal (TRS) purpose.

The specific purpose may be differentiated by an indicator included in RRC signaling.

If the DMRS type is set to DMRS type 2, the DMRS and the CSI-RS may be FDMed in the specific symbol.

In addition to setting the DMRS type to DMRS type 2, more limitation may be put so that only when the CSI-RS is N-(or larger) port CSI-RS and two or more CSI-RS component RE patterns are aggregated in one symbol, the DMRS and the CSI-RS are FDMed in the specific symbol.

FIG. 11 is a flowchart illustrating a method of operation of a UE for multiplexing a DMRS and an SRS as proposed in the disclosure.

First, the UE transmits a DMRS to a base station (S1110).

The UE transmits the SRS to the base station (S1120).

Here, frequency division multiplexing (FDM) between the DMRS and the SRS in a specific symbol may be determined based on the DMRS type.

Likewise, the type of the DMRS may be DMRS type 1 or DMRS type 2.

If the DMRS type is set to DMRS type 1, and the SRS is configured with a comb structure other than comb 1 in the frequency domain, the DMRS and the SRS may be FDMed in the specific symbol.

If the DMRS type is set to DMRS type 2, the DMRS and the CSI-RS may not be FDMed in the specific symbol.

Devices to which the Disclosure May Apply

FIG. 12 is a block diagram illustrating a configuration of a wireless communication device to which methods proposed according to the disclosure are applicable.

Referring to FIG. 12, a wireless communication system includes a base station 1210 and a plurality of UEs 1220 positioned in the coverage of the base station.

The base station and the UE each may be represented as a wireless device.

The base station includes a processor 1211, a memory 1212, and a radio frequency (RF) module 1213. The processor implements the functions, processes or steps, and/or methods proposed above in connection with FIGS. 1 to 11. Wireless interface protocol layers may be implemented by the processor. The memory is connected with the processor and stores various pieces of information for driving the processor. The RF module is connected with the processor and transmits and/or receives wireless signals.

The UE includes a processor 1221, a memory 1222, and an RF module 1223.

The processor implements the functions, processes or steps, and/or methods proposed above in connection with FIGS. 1 to 11. Wireless interface protocol layers may be implemented by the processor. The memory is connected with the processor and stores various pieces of information for driving the processor. The RF module is connected with the processor and transmits and/or receives wireless signals.

The memory 1212 and 1222 may be positioned inside or outside the processor 1211 and 1221 and be connected with the processor 1411 and 1421 via various known means.

The base station and/or the UE may include a single or multiple antennas.

FIG. 13 is a block diagram illustrating a configuration of a communication device according to an embodiment of the disclosure.

In particular, FIG. 13 illustrates in greater detail the UE of FIG. 12.

Referring to FIG. 13, the UE may include a processor (or a digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (which is optional), a speaker 1345, and a microphone 1350. The UE may include a single or multiple antennas.

The processor 1310 implements the functions, processes or steps, and/or methods proposed above in connection with FIGS. 1 to 11. Wireless interface protocol layers may be implemented by the processor.

The memory 1330 is connected with the processor to store information related to the operation of the processor. The memory 1330 may be positioned inside or outside the processor and be connected with the processor via various known means.

For example, the user inputs instruction information, e.g., a phone number, by voice activation using the microphone 1350 or by pressing (or touching) a button of the keypad 1320. The processor receives the instruction information and handles performing a proper function, e.g., calling at the phone number. Operational data may be extracted from the SIM card 1325 or the memory 1330. Further, the processor may display the instruction information or operational information on the display 1315 for convenience or user's recognition.

The RF module 1335 is connected with the processor to transmit and/or receive RF signals. The processor transfers instruction information to the RF module to initiate communication, e.g., to transmit a wireless signal constituting voice communication data. The RF module includes a receiver and a transmitter for receiving and transmitting wireless signals. The antenna 1340 functions to transmit and receive wireless signals. Upon receiving a wireless signal, the RF module transfers the signal for processing by the processor and convert the signal into a base-band signal. The processed signal may be converted into readable or audible information output via the speaker 1345.

FIG. 14 is a view illustrating an example RF module of a wireless communication device to which a method proposed herein is applicable.

Specifically, FIG. 14 illustrates an example RF module that may be implemented in a frequency division duplex (FDD) system.

First, in a transmission path, the processor described above in connection with FIGS. 12 and 13 processes data to be transmitted and provides an analog output signal to a transmitter 1410.

In the transmitter 1410, the analog output signal is filtered by a low pass filter (LPF) 1411 for removing images caused by digital-to-analog conversion (ADC), up-converted from baseband to RF by an up-converter (e.g., Mixer) 1412, and amplified by a variable gain amplifier (VGA) 1413. The amplified signal is filtered by a filter 1414, further amplified by a power amplifier (PA) 1415, routed via duplexer(s) 1450/antenna switch(es) 1460, and transmitted via an antenna 1470.

In a reception path, the antenna 1470 receives signals from the outside and provides the received signals. The signals are routed via the antenna switch(es) 1460/duplexers 1450 and are provided to a receiver 1420.

In the receiver 1420, the received signals are amplified by a low noise amplifier (LNA) 1423, filtered by a band pass filter 1424, and down-converted from RF to baseband by a down-converter (e.g., a mixer) 1425.

The down-converted signals are filtered by a low pass filter (LPF) 1426 and amplified by a VGA 1427 so that an analog input signal is obtained. The obtained analog input signal is provided to the processor described above in connection with FIGS. 12 and 13.

A local oscillator (LO) generator 1440 generates transmission and reception LO signals and provides them to the up-converter 1412 and the down-converter 1425, respectively.

A phase locked loop (PLL) 1430 receives control signals from the processor to generate transmission and reception LO signals at proper frequencies and provide the control signals to the LO generator 1440.

The circuits shown in FIG. 14 may have a different arrangement than that shown in FIG. 14.

FIG. 15 is a view illustrating another example RF module of a wireless communication device to which a method proposed herein is applicable.

Specifically, FIG. 15 illustrates an example RF module that may be implemented in a time division duplex (TDD) system.

In the TDD system, the transceiver 1510 and receiver 1520 of the RF module are identical in structure to the transceiver and receiver of the RF module in the FDD system.

The following description of the RF module of the TDD system focuses primarily on differences from the RF module of the FDD system, and the description in connection with FIG. 14 may apply to the same structure.

The signal amplified by the power amplifier (PA) 1515 of the transmitter is routed via the band select switch 1550, the band pass filter (BPF) 1560, and antenna switch(es) 1570 and is transmitted via the antenna 1580.

In a reception path, the antenna 1580 receives signals from the outside and provides the received signals. The signals are routed via the antenna switch(es) 1570, band pass filter 1560, and band select switch 1550 and are provided to the receiver 1520.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

INDUSTRIAL AVAILABILITY

Although the scheme of multiplexing between a DMRS and a specific RS in the wireless communication system according to the disclosure has been described in connection with examples in which it applies to 5G systems (new RAT systems), the scheme is also applicable to other various wireless communication systems.

The invention claimed is:

1. A method performed by a user equipment (UE) for receiving a demodulation reference signal (DMRS) and a channel state information-reference signal (CSI-RS) in a wireless communication system, the method comprising:
receiving the DMRS from a base station; and
receiving the CSI-RS from the base station, wherein
frequency division multiplexing (FDM) between the DMRS and the CSI-RS in a pre-defined symbol is determined based on a DMRS type,
wherein a pattern for Resource Elements (REs) of the CSI-RS is configured based on a pre-defined table which is related to CSI-RS RE patterns,
wherein the pre-defined table includes information for i) a number of CSI-RS ports, ii) a type of code-division multiplexing (CDM) and iii) a density related to the CSI-RS,
wherein the DMRS type is set to i) DMRS type 1 which is related to a DMRS pattern supporting up to 8 antenna ports or ii) DMRS type 2 which is related to a DMRS pattern supporting up to 12 antenna ports,
wherein, based on that the DMRS type is set to the DMRS type 1:
  i) a position of REs of the DMRS within the pre-defined symbol is determined based on two combs that are related to different REs in a frequency domain, and
  ii) the FDM is applied, based on that a number of consecutive REs related to the configured pattern in the frequency domain is 1 and a number of consecutive REs related to the configured pattern in a time domain is equal to or greater than 2,
wherein, based on that the DMRS type is set to the DMRS type 2:
  i) the REs of the DMRS are configured based on a range which is defined as four consecutive REs per one DMRS port in the frequency domain, and
  ii) the FDM is applied, based on that a number of the REs of the CSI-RS based on the configured pattern in one symbol is less than 5.

2. The method of claim 1, wherein,
based on that the DMRS type being set to the DMRS type 1, and the CSI-RS is set for a pre-defined purpose, the DMRS and the CSI-RS may be FDMed in the pre-defined symbol.

3. The method of claim 2, wherein
the pre-defined purpose is a beam management purpose or a tracking reference signal (TRS) purpose.

4. The method of claim 3, wherein
the pre-defined purpose is differentiated by an indicator included in RRC signaling.

5. The method of claim 1, wherein,
based on that the DMRS type is set to the DMRS type 2 and a number of ports of the CSI-RS is equal to or greater than a pre-defined number of ports, and two or more CSI-RS component RE patterns are aggregated in one symbol, the DMRS and the CSI-RS are FDMed in the pre-defined symbol.

6. A user equipment (UE) for receiving a demodulation reference signal (DMRS) and a channel state information-reference signal (CSI-RS) in a wireless communication system, the UE comprising:
a radio frequency (RF) module for transmitting/receiving a radio signal; and
a processor functionally connected with the RF module, wherein the processor is configured to
receive the DMRS from a base station and
receive the CSI-RS from the base station, wherein
frequency division multiplexing (FDM) between the DMRS and the CSI-RS in a pre-defined symbol is determined based on a DMRS type,
wherein a pattern for Resource Elements (REs) of the CSI-RS is configured based on a pre-defined table which is related to CSI-RS RE patterns,
wherein the pre-defined table includes information for i) a number of CSI-RS ports, ii) a type of code-division multiplexing (CDM) and iii) a density related to the CSI-RS,
wherein the DMRS type is set to i) DMRS type 1 which is related to a DMRS pattern supporting up to 8 antenna ports or ii) DMRS type 2 which is related to a DMRS pattern supporting up to 12 antenna ports,
wherein, based on that the DMRS type is set to the DMRS type 1:
  i) a position of REs of the DMRS within the pre-defined symbol is determined based on two combs that are related to different REs in a frequency domain, and
  ii) the FDM is applied, based on that a number of consecutive REs related to the configured pattern in the frequency domain is 1 and a number of consecutive REs related to the configured pattern in a time domain is equal to or greater than 2,
wherein, based on that the DMRS type is set to the DMRS type 2:
  i) the REs of the DMRS are configured based on a range which is defined as four consecutive REs per one DMRS port in the frequency domain, and
  ii) the FDM is applied, based on that a number of the REs of the CSI-RS based on the configured pattern in one symbol is less than 5.

7. A method performed by a base station for transmitting a demodulation reference signal (DMRS) and a channel state information-reference signal (CSI-RS) in a wireless communication system, the method comprising:
transmitting the DMRS to a user equipment (UE); and
transmitting the CSI-RS to the UE,
wherein frequency division multiplexing (FDM) between the DMRS and the CSI-RS in a pre-defined symbol is determined based on a DMRS type,
wherein a pattern for Resource Elements (REs) of the CSI-RS is configured based on a pre-defined table which is related to CSI-RS RE patterns,
wherein the pre-defined table includes information for i) a number of CSI-RS ports, ii) a type of code-division multiplexing (CDM) and iii) a density related to the CSI-RS,
wherein the DMRS type is set to i) DMRS type 1 which is related to a DMRS pattern supporting up to 8 antenna ports or ii) DMRS type 2 which is related to a DMRS pattern supporting up to 12 antenna ports,
wherein, based on that the DMRS type is set to the DMRS type 1:
  i) a position of REs of the DMRS within the pre-defined symbol is determined based on two combs that are related to different REs in a frequency domain, and
  ii) the FDM is applied, based on that a number of consecutive REs related to the configured pattern in the frequency domain is 1 and a number of consecutive REs related to the configured pattern in a time domain is equal to or greater than 2,
wherein, based on that the DMRS type is set to the DMRS type 2:

i) the REs of the DMRS are configured based on a range which is defined as four consecutive REs per one DMRS port in the frequency domain, and ii) the FDM is applied, based on that a number of the REs of the CSI-RS based on the configured pattern in one symbol is less than 5.

* * * * *